June 1, 1965 H. R. GELLING ETAL 3,186,891
APPARATUS FOR JOINING THERMOPLASTIC ELEMENTS
Filed May 14, 1962 5 Sheets-Sheet 3
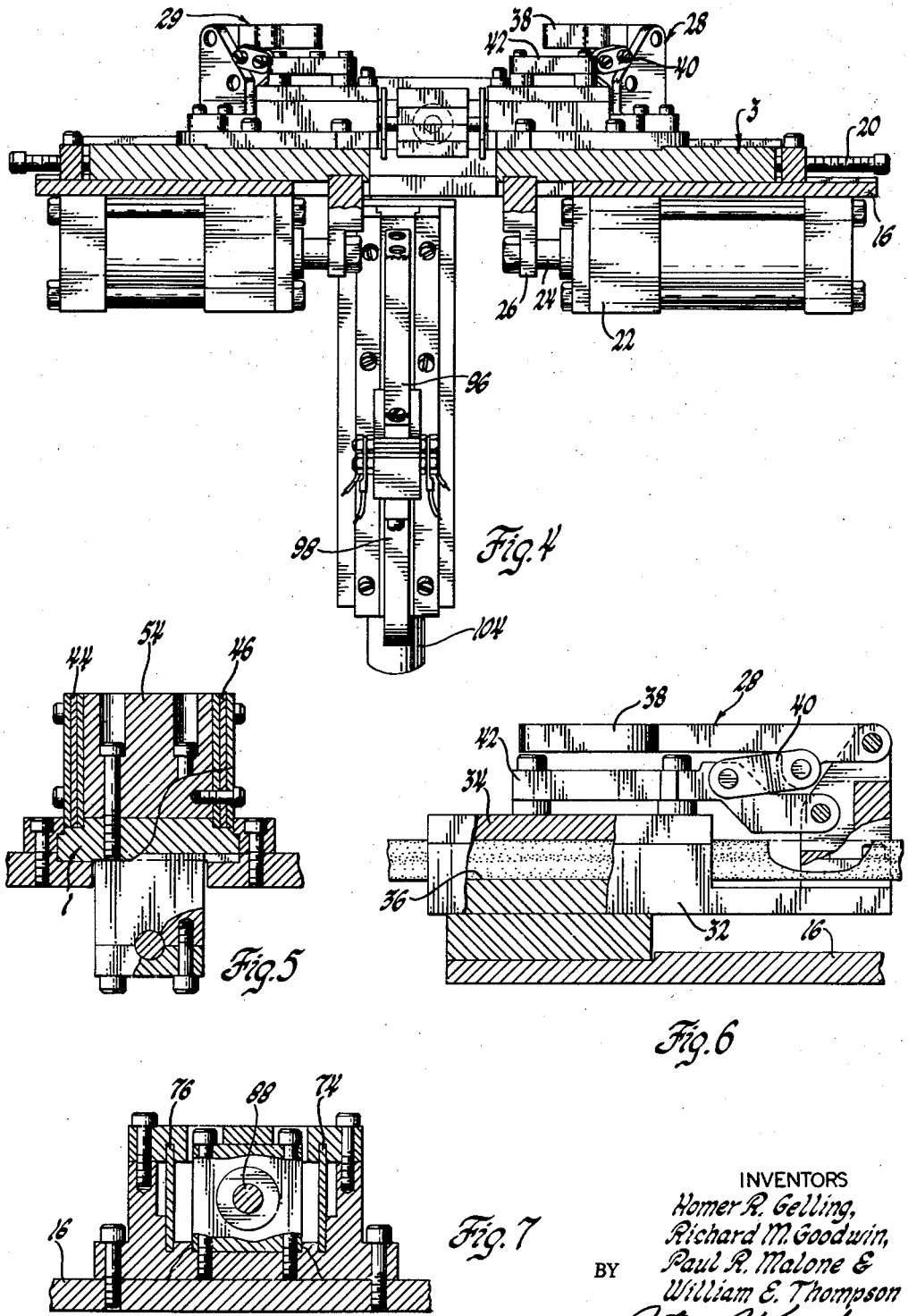
INVENTORS
Homer R. Gelling,
Richard M. Goodwin,
Paul R. Malone &
William E. Thompson
BY
Peter P. Kozak
ATTORNEY June 1, 1965  H. R. GELLING ETAL  3,186,891
APPARATUS FOR JOINING THERMOPLASTIC ELEMENTS
Filed May 14, 1962  5 Sheets-Sheet 4
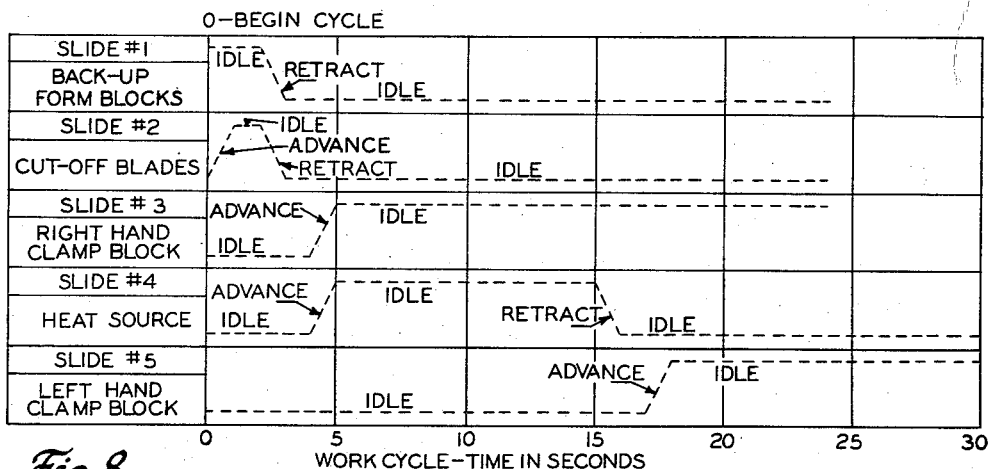
Fig.8
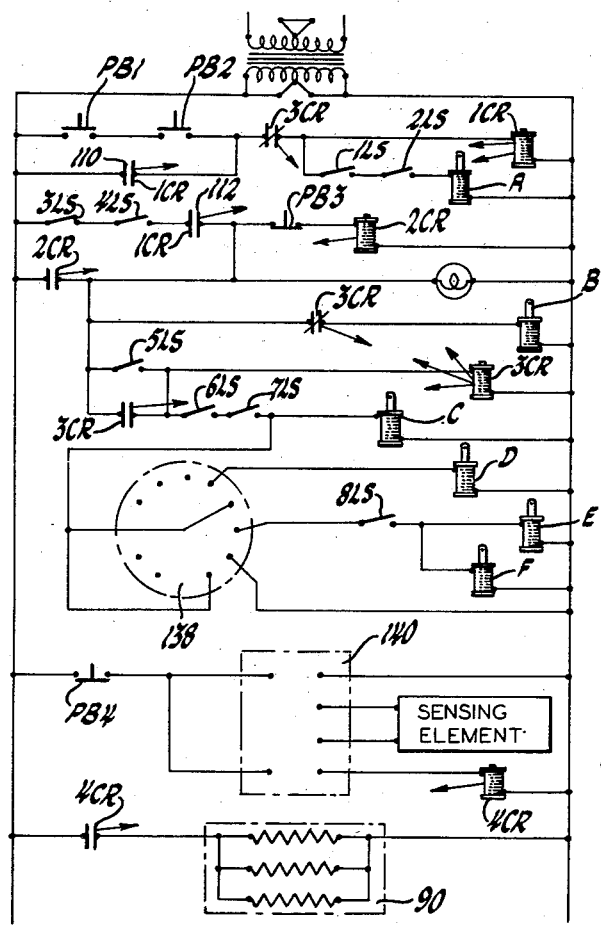
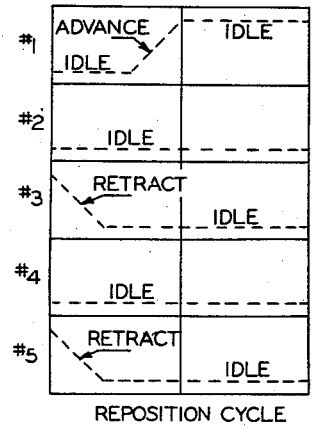
Fig.9
Fig.10
INVENTORS
Homer R. Gelling,
Richard M. Goodwin,
Paul R. Malone &
William E. Thompson
BY
Peter P. Kozak
ATTORNEY

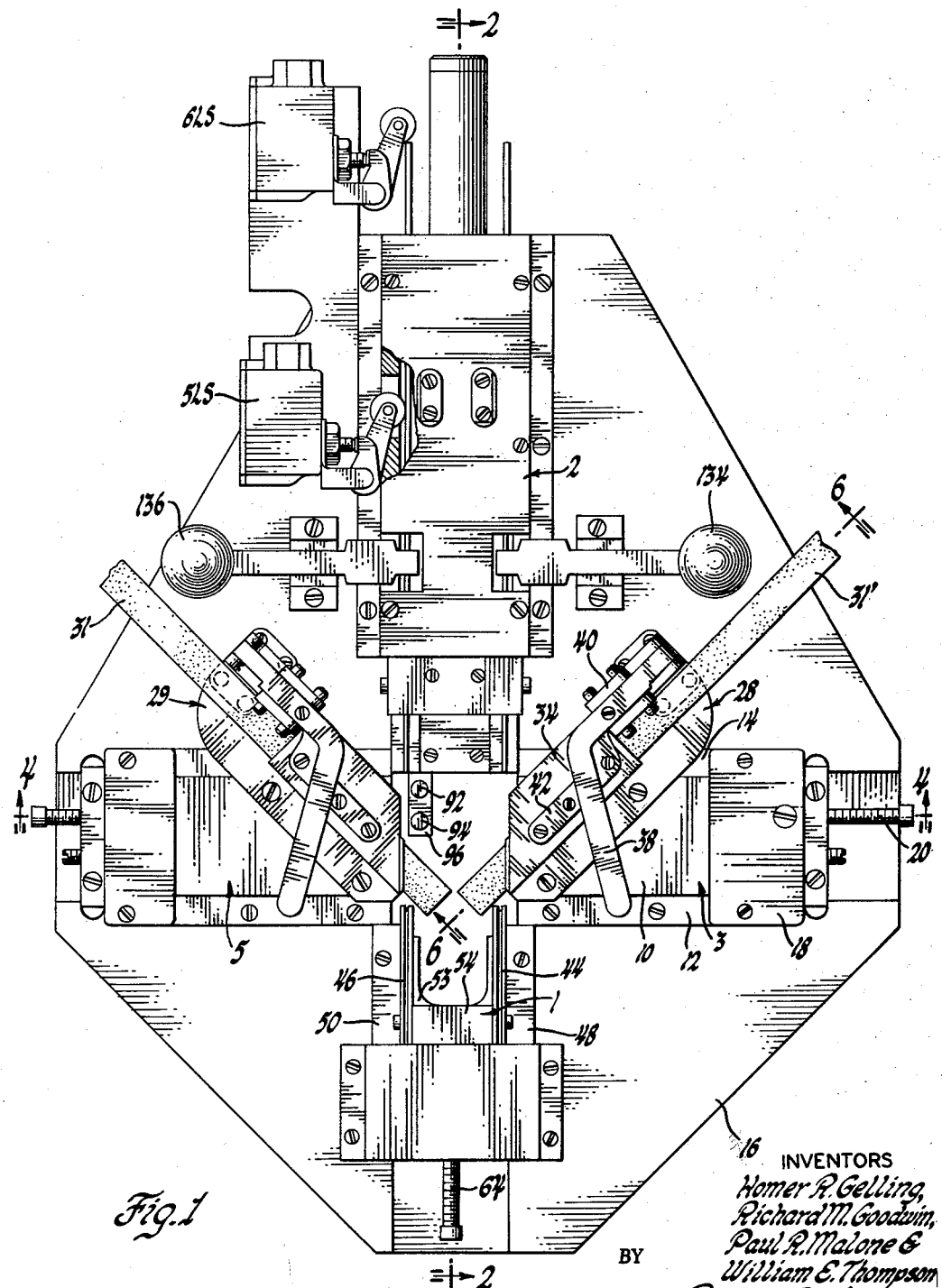

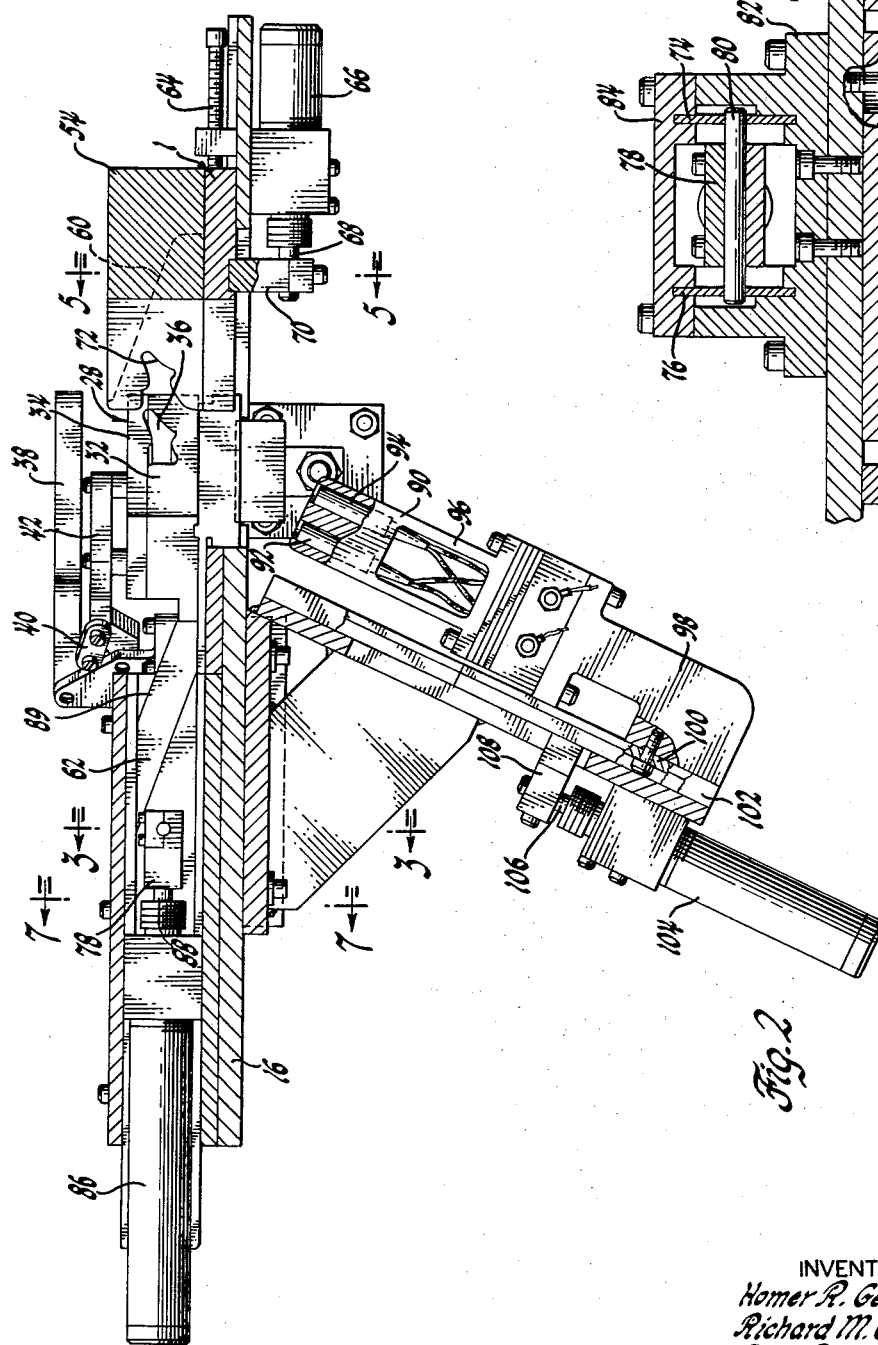

3,186,891
APPARATUS FOR JOINING THERMOPLASTIC ELEMENTS
Homer R. Gelling, Richard M. Goodwin, Paul R. Malone, and William E. Thompson, Anderson, Ind., assignors to General Motors Corporation, Detroit, Mich., a corporation of Delaware
Filed May 14, 1962, Ser. No. 194,602
5 Claims. (Cl. 156—502)

This invention relates to apparatus for joining thermoplastic materials and more particularly to apparatus for welding foam thermoplastic synthetic resin weatherstrips by the radiant heating of opposed surfaces of the thermoplastic members to be joined, and thereafter moving the softened surfaces into contact and permitting the thusly formed joint to solidify.

It is an object of this invention to provide an apparatus for efficiently and economically joining elongated thermoplastic members, such as vinyl foam weatherstrips or the like. It is another object of this invention to provide apparatus for welding or fusing thermoplastic members which performs the steps of rapidly and efficiently mitering the edges to be joined, heating the surfaces to be joined to a softening point, and then moving the surfaces into abutting contact and permitting them to cool and solidify. Another object of the invention is to provide apparatus for efficiently cutting or mitering the ends of the thermoplastic articles to be joined and heat-fusing them without burning or scorching the thermoplastic material at the joint.

Other objects and advantages of this invention will be apparent from the following description and the drawings in which:

FIGURE 1 is a plan view of the apparatus of this invention;

FIGURE 2 is a cross-sectional view taken along line 2—2 of FIGURE 1;

FIGURE 3 is a fragmentary cross-sectional view taken along line 3—3 of FIGURE 2;

FIGURE 4 is a cross-sectional view taken along line 4—4 of FIGURE 1;

FIGURE 5 is a cross-sectional view taken along line 5—5 of FIGURE 2;

FIGURE 6 is a fragmentary cross-sectional view taken along line 6—6 of FIGURE 1;

FIGURE 7 is a fragmentary view taken along line 7—7 of FIGURE 2;

FIGURE 8 is a chart showing the preferred cycle for operating the apparatus;

FIGURE 9 is a chart showing the repositioning of the apparatus components at the end of a cycle to begin another;

FIGURE 10 is a schematic diagram of an electrical circuit for operating the apparatus of this invention in accordance with the cycle of FIGURE 8;

Figure 14:
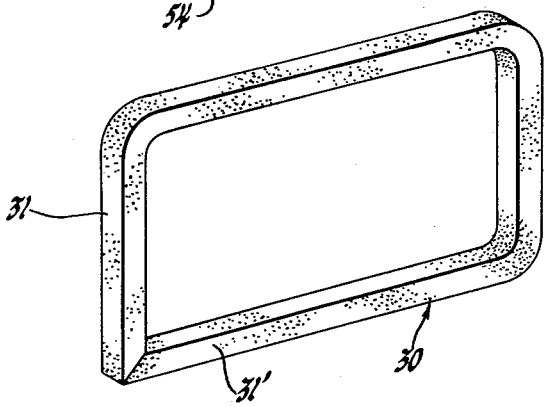
FIGURE 14 is a perspective view of a weatherstrip having a mitered corner.

The use of weatherstrips formed of thermoplastic vinyl resins, such at those disclosed in co-pending United States patent application Serial No. 17,518, filed March 25, 1960, in the names of Lyle N. Williams et al., and assigned to the assignee of the present invention, for use in automobile bodies makes it necessary to provide weatherstrip elements, such as is shown in FIGURE 14 of the drawings, which involves a neat, accurately formed ninety-degree corner. Conventional methods for joining the members may include the steps of softening the surfaces of the members to be joined by treating them with a volatile solvent after they have been suitably cut, or by heating the surfaces by placing them either in contact with a hot gas or in contact with a heating element similar to a soldering iron, then pressing the softened surfaces together and molding them in a desired position until the surfaces have solidified, either by evaporation of the solvent or by cooling.

Junctions formed by the conventional methods indicated above have not been completely satisfactory in that solvents employed are expensive and present a fire hazard. If a heat bond is employed, the techniques previously used for heating the junctions commonly result in a scorched or burned junction and, accordingly, in a weak or defective bond. Frequently the areas adjacent the juncture are commonly defective or distorted because of excessive heating of the thermoplastic materials.

Referring to the drawings, the apparatus of this invention includes holder means for holding weatherstrip members or the like, means for advancing these holders to a point at which a specially designed cutting means may slice the elements in accordance with a desired junction angle, radiant heating means, means for introducing the heating means between, but spaced from, the members to be joined and heating them uniformly to a desired plastic state, means for withdrawing the heating element, means for advancing the holding means further to place the heated surfaces in abutting relationship until the softened surfaces have fused and solidified, and finally, means for controlling the movements of the aforementioned elements in accordance with a prescribed cycle whereby the vinyl strips are joined in a strong and accurate juncture.

The apparatus of this invention performs the sequential steps of holding the pair of thermoplastic articles to be joined at an angle of ninety degrees to each other, slicing the ends of the weatherstrips to a forty-five degree angle with respect to the longitudinal axis of each of the articles while supporting or backing up the articles to obtain an accurate cut, interposing the heating means between the faces of the weatherstrips in close proximity to the heating element, but spaced therefrom, and after a predetermined time, moving the heating element away and advancing the heated weatherstrip faces into abutting relationship.

Referring to FIGURE 1 of the drawings, the means for holding the weatherstrips are mounted on the slides 3 and 5. Slide 3 consists of a plate 10 which is positioned for reciprocal transverse movement between bars or rails 12 and 14 which are bolted to a base plate 16. The slide 3 is held between the rails 12 and 14. A cover plate 18 is provided for safety purposes. A setscrew 20, as is best seen in FIGURE 4, limits the travel of the slide 3 to the left in an obvious manner. The slide 3 is reciprocably moved along the rails 12 and 14 by compressed air means, including an air cylinder 22, operatively attached to the slide 3 by means of a connecting bar 26 bolted to the piston rod 24 and attached to the slide 3.

Mounted on the slide 3 by bolt means is a holder fixture 28 for holding the weatherstrip element 30. As may be seen in relation to the FIGURES 1, 2 and 6, the fixture 28 consists of a block 32 including a cover plate 34 having therebetween a cavity 36 in the shape of the sealing strips to be joined in the apparatus. A hand lever 38 is provided which is pivotably connected to a link 40 connected pivotably to a pressure bar 42 bolted to the cover plate 34. The link 40 is attached to the crank 42 and handle 38 in a manner that when the handle 38 is brought to a horizontal position, as shown, the link 40 is in overcenter position with respect to the pressure bar 42 so that the latter is locked in place. It will be obvious that to position the weatherstrip in the holder 28, it is only necessary to raise the handle 38 which, in turn, operates to raise the plate 34 to expose the cavity 36. The sealing strip is then placed in position, and the plate 34 is replaced and locked in place by a downward movement of the handle 38.

The slide 5 is identical in its construction except that its mechanism is reversed in operation with respect to the slide 3 so that the slides 3 and 5 cooperate to support the wetherstrip ends 31 and 31' in a desired relationship with respect to each other, to be described hereinafter.

An important feature of the invention is the cutting mechanism associated with the slides 1 and 2. As may be best seen in FIGURES 1, 2, 3, 5 and 7, and specifically referring to FIGURE 1, the slide 1 having a U-shaped portion 53 has bolted thereto a block 54 having fastened thereto in spaced relation a pair of guides 44 and 46 which, as will be hereinafter described, serves as a back-up means which cooperates with a pair of knife blades mounted on the slide 2 to slice the ends 31 and 31'. The slide 1, as may be seen in FIGURES 1 and 2, is slidably positioned between a pair of bars or rails 48 and 50 bolted to the base 16 and is longitudinally slidable therebetween. As may be best seen in FIGURES 1, 2 and 5, the guides 44 and 46 consist of a stack of three plates each bolted vertically to a block 54 fastened to the slide 1 of which the intermediate plate of each set is recessed to form a slot, as indicated by the broken line 60 of FIGURE 2. The intermediate undercut plate of each set forms recesses for receiving the knife blades 62, to be described more fully hereinafter. Slide 1 is limited in its outward movement by the setscrew 64. The slide 1 is adapted for longitudinal movement along the rails 48 and 50 in response to the movement of a pneumatic cylinder 66 having a connecting rod 68 attached to a bar 70 attached to the slide 1. The outer plates of each of the guides 44 and 46 have a depression 72 cut therein adapted to snugly receive sealing ends 31 and 31' to be cut therein as the slide 1 is moved leftward toward the slides 3 and 5.

The opposite portion of the cutting mechanism is associated with the slide 2, as is best shown in FIGURES 1, 2, 3 and 7. As shown in FIGURES 3 and 7, a pair of knife blades 74 and 76 are attached to a block 78 by means of a pin 80. The blades 74 and 76 travel in grooves fashioned in the channel block 82 bolted to the base 16. The upper portions of the blades 74 and 76 travel in grooves provided in a plate 84 bolted to the channel-shaped lower member 82.

As shown in FIGURE 2, the block 78 is connected to a pneumatic cylinder 86 by means of the connecting rod 88. As previously mentioned, the knife blades 74 and 76 are adapted to be received between the plates of each of the guides 44 and 46 below the intermediate plate thereof.

In operation, the slide 1 is adapted to move to the left sufficiently to snugly receive the sealing strip protruding from the cavity 36, after which the knife blades 74 and 76 are moved to the right in response to the actuation of the pneumatic cylinder 86 whereby the weatherstrip is cleanly sliced. An essential aspect of the invention resides in providing the knife blades with downward sloping configurations 89 which are received below the portion of each intermediate plate of each of the guides 44 and 46 defined by the line 60 to effect a clean efficient cut. It has been found that these configurations are essential to satisfactory operation of the apparatus.

Figure 12:
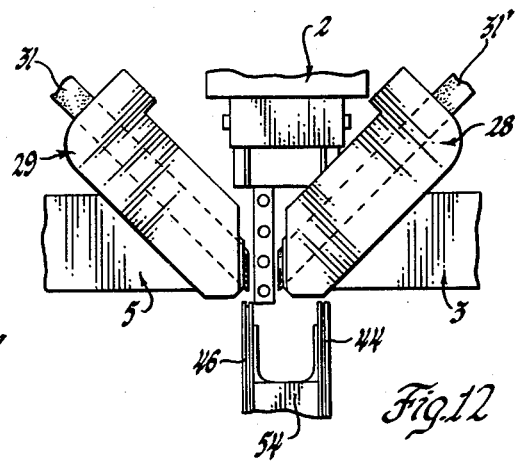
Figure 13:
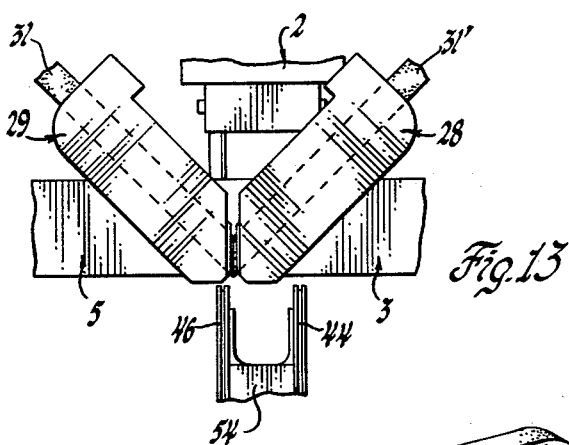

A further aspect of the invention is the provision of means for heating the facing ends of the freshly cut weatherstrip ends 31 and 31'. After the cutting operation, the slides 3 and 5 move toward each other a predetermined amount. As shown in FIGURE 1, preferably the slide 5 remains stationary while the slide 3 moves toward the slide 5. At this point a heating element 90, preferably consisting of electrical resistance heating elements 92 and 94, embedded in an iron casing 96 is moved between the freshly cut ends of the weatherstrip ends 31 and 31' as shown in FIGURE 12. As shown in FIGURE 2, the heating element is bolted to an arm 98 bolted to a slide 100 slidably held between a pair of rails 102 on each side of the slide 100 in a manner similar to that of slides 3, 5 and 1. The slide 100 is, in turn, connected to pneumatic piston 104 by means of the connecting rod 106 connected to a bar 108 attached to the slide 100.

Figure 11:
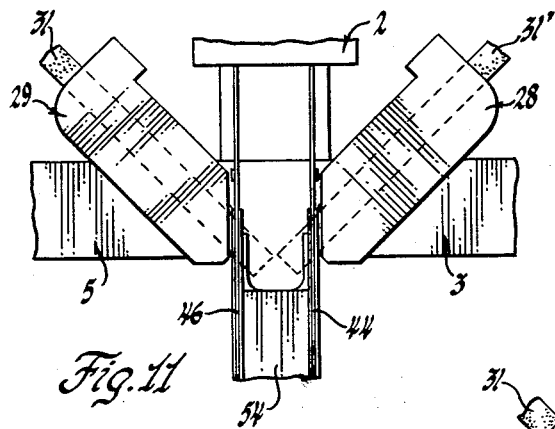
FIGURES 11, 12 and 13 show the apparatus at various sequential stages in the cycle.

FIGURE 8 shows a typical cycle whereby a pair of weatherstrips are mitered to make a ninety-degree joint and are fused or bonded together. FIGURE 9 shows the last part of the cycle, which is made after the joint is completed and the weatherstrip removed to reposition the various slides for the commencement of a new cycle. At the beginning of a cycle slides 1, 2, 3, and 5 are retracted, as indicated in FIGURE 8, and the slide 4 is depressed. The weatherstrip joining operation is commenced by opening the holders 28 by means of the handles 38 and inserting the weatherstrip therein which snugly fits the cavity 36. These strips are positioned, as shown in FIGURE 1, to be of sufficient length so that they almost touch one another. The electrical mechanism for operating the various pneumatic cylinders, to be hereinafter described in connection with FIGURE 10, is then actuated to begin the cycle shown in FIGURE 8. As the cycle commences, the slide 1 carrying the guides 44 and 46 is advanced to the left whereby the recess 72 snugly receives the ends 31 and 31'. The slide 2, carrying the cutoff blades 74 and 76, is advanced to the right to slice or miter the ends of the sealing strip, as shown in FIGURE 11. During these operations the slides 3 and 5, carrying the clamp blocks or holders, are idle. After a second's duration, the slides 1 and 2 are retracted to clear the area between the cut edges for further process steps. An idle second follows, after which the right holder 28 is advanced to the predetermined position, but spaced from the holder 29. Simultaneously, the slide 4, carrying the heating element 96, is raised up vertically to a point between the freshly cut weatherstrip surfaces, as shown in FIGURE 12. After a heating time of ten seconds, the heating element is withdrawn between the fifteenth and sixteenth seconds of the cycle. Then, in the seventeenth second, the slide 5, carrying the left holder 29, is advanced into contact with the other sealing strip. After a few seconds, the joined weatherstrip is removed from the fixture, as shown in FIGURE 14.

Preferably, the above-indicated operations are performed by electrical means, such as is illustrated in the schematic diagram of FIGURE 10. In this diagram there are shown a solenoid A for operating the knife guide and backup of slide 1, a solenoid B for operating knives of slide 2, a solenoid C for operating the right holder of slide 3, a solenoid D for operating the heater of slide 4, a solenoid E for operating the left holder of slide 5, and solenoid F for operating a cooling air device (not shown) such as an air blower. The various elements labeled CR on FIGURE 10 represent relays which control the sequence of events in the cycle. The elements labeled LS are limit switches. The sensing element controls the heating element 90 to maintain a constant temperature. The interrelation of these elements and their function will be readily apparent to those skilled in the art.

The joining of strips is commenced by clamping them in the holders 28 and 29. At this time all of the slides 1 through 5 are retracted. The joining cycle is commenced by actuating the mushroom switches PB1 and PB2, which are preferably mounted on either side of the machine and are closed simultaneously by the operator for safety purposes. The closing of these switches causes the control relay 1CR to close the contacts 110 and 112. The solenoid A causes slide 1 to advance, as is shown in FIGURE 11.

At zero seconds, the starting cycle, as shown in the sequence chart of FIGURE 8, the operator depresses the two rods 134 and 136 whereby the switches 3LS and 4LS are closed, causing the slide 2 to advance. As a consequence of the movement of slide 2, the ends of the weatherstrip are cut off at a forty-five degree angle. The cutoff blades then closes the limit switch 5LS whereby the slides 1 and 2 are returned to their original positions against their respective setscrew abutments. When the slide 1 has returned to its original position, the limit switch 7LS is closed. The limit switch 6LS is then closed by the retracting of slide 1, and the slide 3 advances, and the slide 4 carrying the heating block advances. The heating time is variable, from approximately five to fifteen seconds after commencement of the cycle, and is determined by adjusting the heating block timer. As the slide 4 goes down, the limit switch 8LS is closed, which causes the slide 5 to advance thereby bringing the two heated ends of the weatherstrip into contact with each other and starts the cooling air blower. Approximately twenty-five to thirty seconds after the commencement of the cycle, the weatherstrip has cooled sufficiently, and the bond is completed. The weatherstrip is then removed from the clamp, and the slides 3 and 5 are retracted by the operator by the use of the mushroom switch PB3 to complete the sequence, as shown in FIGURE 9.

While the invention has been described by means of certain specific examples, it is to be understood that its scope is not to be limited thereby except as defined in the following claims.

We claim:

1. Apparatus for joining two elongated thermoplastic members comprising in combination first and second holder means adapted for firmly holding said members to be joined with the ends thereof projecting beyond said holders and facing one another, said holders being movable toward and away from one another along a linear path between a first position and a second position, back-up means movable to and away from a back-up position abutting the end portions of said members when said holders are in said first position, said back-up means having a contoured surface adapted to snugly receive the projecting ends of said thermoplastic members when said holders are in said first position, cutter means movable toward and away from said back-up means and into engagement therewith, heating means movable to and away from a heating position between said first and second holder means, power and control means for moving said second holder means to said first position, for advancing said back-up means to said back-up position and said cutter means into engagement with said back-up means whereby the said end portions of said thermoplastic members are received in said contoured surface and are cut to present mutually facing parallel surfaces to be joined, for retracing said back-up means and said cutter means after said members have been cut, for moving said heating means to said heating position between said faces to be joined, for retracing said heating means after a predetermined time necessary to melt said face surfaces and for quickly further advancing said holder means toward each other to said second position whereby the melted faces are joined and permitted to solidify.

2. Apparatus for joining two elongated thermoplastic members comprising in combination first and second holder means adapted for firmly holding said members to be joined with the ends thereof projecting beyond said holders and facing one another, said holders being movable toward and away from one another along a linear first path between a first and second position, back-up means movable to and away from a back-up position abutting the end portions of said members when said holders are in said first position, said back-up means having a contoured surface adapted to snugly receive the projecting ends of said thermoplastic members when said holders are in said first position, downwardly sloping cutter means movable into engagement with said back-up means, heater means movable vertically to and away from a heating position between said first and second holder means, said holder means being mounted on movable slides along said path, said back-up and cutter means being mounted on movable slides along a second linear path perpendicular to said first path, said heating means being mounted on a slide vertically movable along a third path at a substantial angle to said second path, and power and control means for advancing said first and second holder means to said first position for advancing said back-up means and said cutter means toward each other into engagement whereby end portions of thermoplastic members supported in said holding means are received in said contoured surface and are cut to present mutually facing parallel surfaces to be joined, for retracting said back-up means and said cutter means after said members have been cut, for moving said heating means between said faces to be joined, for retracting said heating means after a predetermined time necessary to melt said face surfaces and for quickly further advancing said first and second holder means to said second position whereby the melted faces are joined and permitted to solidify.

3. Apparatus for joining two elongated plastic members comprising in combination first and second holder means adapted for firmly holding said members to be joined with the ends thereof projecting beyond said holders and facing one another, said holders being movable toward and away from one another along a linear path between a first position and a second position, back-up means movable to and away from a back-up position abutting the end portions of said members when said holders are in said first position, said back-up means having a contoured surface adapted to snugly receive the projecting ends of said thermoplastic members when said holders are in said first position, said back-up means including first and second slots in spaced relation, cutter means movable toward and away from said back-up means and having a pair of spaced cutter blades adapted to be received in said slots, heating means movable to and away from a heating position between said first and second holder means, and power and control means for moving said first and second holder means to said first position, for moving said back-up means and said cutter means toward each other into engagement whereby the end portions of the thermoplastic members supported in said holding means are received in said contoured surface and said cutter blades are received in said slots whereby said end portions are cut to present mutually facing parallel surfaces to be joined, for retracting said back-up means and said cutter means after said members have been cut, for advancing said heating means between said faces to be joined, for retracting said heating means after a predetermined time necessary to melt said face surfaces, and for quickly moving said first and second holder means to said first position whereby the melted faces are joined and permitted to solidify.

4. Apparatus for joining two elongated thermoplastic members comprising in combination first and second holder means adapted for firmly holding said members to be joined with the ends thereof projecting beyond said holders and facing one another, said holders being movable toward and away from one another along a linear path between a first position and a second position, back-up means movable to and away from a back-up position abutting the end portions of said members when said holders are in said first position, said back-up means having a contoured surface adapted to snugly receive the projecting ends of said thermoplastic members when said holders are in said first position.

cutter means movable toward and away from said back-up means and into engagement therewith, heating means movable to and away from a heating position between said first and second holder means, hydraulic means for moving said second holder means to said first position, for advancing said back-up means to said back-up position and said cutter means into engagement with said back-up means whereby the said end portions of said thermoplastic members are received in said contoured surface and are cut to present mutually facing parallel surfaces to be joined, for retracting said back-up means and said cutter means after said members have been cut, for moving said heating means to said heating position between said faces to be joined, for retracting said heating means after a predetermined time necessary to melt said face surfaces and for quickly further advancing said holder means toward each other to said second position whereby the melted faces are joined and permitted to solidify, and solenoid means for operating said hydraulic power means.

5. Apparatus for mitering and joining two elongated thermoplastic members at a predetermined angle comprising in combination first and second holder means adapted for holding said members to be joined at said angle relative to each other with the ends thereof projecting beyond said holders and facing one another, said holders being movable toward and away from one another along a linear path between a first position and a second position, back-up means movable to and away from a back-up position abutting the end portions of said members when said holders are in said first position, said backup means having a contoured surface adapted to snugly receive the projecting ends of said thermoplastic members when said holders are in said first position, said back-up means including first and second slots in spaced relation, cutter means movable toward and away from said back-up means and having a pair of spaced cutter blades adapted to be received in said slots, heating means movable to and away from a heating position between said first and second holder means, and power and control means for moving said first and second holder means to said first position, for moving said back-up means and said cutter means toward each other into engagement whereby the end portions of the thermoplastic members supported in said holding means are received in said contoured surface and said cutter blades are received in said slots whereby said end portions are cut to present mutually facing parallel surfaces to be joined, for retracting said back-up means and said cutter means after said members have been cut, for advancing said heating means between said faces to be joined, for retracting said heating means after a predetermined time necessary to melt said face surfaces, and for quickly moving said first and second holder means to said first position whereby the melted faces are joined and permitted to solidify.

References Cited by the Examiner

UNITED STATES PATENTS

| | | | |
|---|---|---|---|
| 2,379,500 | 7/45 | Steffens | 156—304 |
| 2,384,014 | 9/45 | Cutter | 156—266 |
| 2,665,738 | 1/54 | Caskin | 156—499 |
| 2,886,482 | 5/59 | Huffman | 156—304 |
| 3,013,925 | 12/61 | Larsen | 156—306 |
| 3,053,726 | 9/62 | Larson et al. | 156—304 |

EARL M. BERGERT, *Primary Examiner*.

DOUGLAS J. DRUMMOND, *Examiner*.